US011727200B2

(12) United States Patent
Wei et al.

(10) Patent No.: US 11,727,200 B2
(45) Date of Patent: Aug. 15, 2023

(54) ANNOTATION TOOL GENERATION METHOD, ANNOTATION METHOD, ELECTRONIC DEVICE AND STORAGE MEDIUM

(71) Applicant: APOLLO INTELLIGENT CONNECTIVITY (BEIJING) TECHNOLOGY CO., LTD., Bejing (CN)

(72) Inventors: Mingzhi Wei, Beijing (CN); Lijuan Zhu, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 112 days.

(21) Appl. No.: 17/304,624

(22) Filed: Jun. 23, 2021

(65) Prior Publication Data
US 2021/0312121 A1    Oct. 7, 2021

(30) Foreign Application Priority Data

Dec. 11, 2020    (CN) .......................... 202011446312.7

(51) Int. Cl.
G06F 17/00    (2019.01)
G06F 40/169    (2020.01)
G06F 40/14    (2020.01)

(52) U.S. Cl.
CPC ............ *G06F 40/169* (2020.01); *G06F 40/14* (2020.01)

(58) Field of Classification Search
CPC ................................ G06F 40/169; G06F 40/14
See application file for complete search history.

(56) References Cited

U.S. PATENT DOCUMENTS 7,453,472 B2 * 11/2008 Goede .................... G06T 19/00
707/E17.031
7,962,847 B2 * 6/2011 Malkin ................. G06F 40/169
715/229

(Continued)

FOREIGN PATENT DOCUMENTS

CN    110163904 A    8/2019
CN    111178845 A    5/2020
(Continued)

OTHER PUBLICATIONS

Office Action received for European Patent Application No. 21184604.3 dated Jul. 25, 2022, 9 pages.
(Continued)

*Primary Examiner* — Mohammed H Zuberi
(74) *Attorney, Agent, or Firm* — Morrison & Foerster LLP

(57) ABSTRACT

An annotation tool generation method, an annotation method, an electronic device and a storage medium, related to the technical field of artificial intelligence such as automatic driving, intelligent transportation, computer vision, deep learning and the like, are provided. The method includes: acquiring a first function module generated based on a first language, wherein the first function module is configured for acquiring a file to be annotated; acquiring a second function module generated based on a second language; converting the second function module into a third function module in a webpage-oriented binary format, wherein the third function module is configured for presenting the file to be annotated on an annotation page and displaying an annotation result corresponding to the file to be annotated on the annotation page; and generating an annotation tool based on the first function module and the third function module.

20 Claims, 10 Drawing Sheets

(56) References Cited

U.S. PATENT DOCUMENTS

| | | | | |
|---|---|---|---|---|
| 8,112,702 | B2* | 2/2012 | Badoiu | G06F 40/169 715/838 |
| 8,151,182 | B2* | 4/2012 | Datar | G11B 27/11 715/230 |
| 8,433,560 | B2* | 4/2013 | Luke | G06N 5/025 707/706 |
| 8,726,144 | B2* | 5/2014 | Chidlovskii | G06F 18/2185 715/231 |
| 8,898,558 | B2* | 11/2014 | Jain | G06F 16/51 709/227 |
| 9,652,359 | B1* | 5/2017 | Spoon | G06F 8/42 |
| 9,659,597 | B2* | 5/2017 | Petajan | H04N 21/84 |
| 9,830,361 | B1* | 11/2017 | Varadarajan | G06F 40/295 |
| 2004/0205482 | A1* | 10/2004 | Basu | G06F 40/169 715/201 |
| 2013/0031453 | A1* | 1/2013 | Griffiths | G06F 40/143 715/230 |
| 2013/0031454 | A1* | 1/2013 | Griffiths | G06F 40/169 715/230 |
| 2013/0031455 | A1* | 1/2013 | Griffiths | G06F 40/169 715/230 |
| 2013/0031457 | A1* | 1/2013 | Griffiths | G06F 40/169 715/231 |
| 2013/0145249 | A1* | 6/2013 | Harper | G06F 40/169 715/230 |
| 2016/0078014 | A1* | 3/2016 | Avasarala | G06F 40/169 704/9 |
| 2020/0082624 | A1 | 3/2020 | Murphy-Chutorian et al. | |
| 2020/0250323 | A1 | 8/2020 | Remington et al. | |

FOREIGN PATENT DOCUMENTS

| | | |
|---|---|---|
| JP | 2008525869 A | 7/2008 |
| JP | 2016004320 A | 1/2016 |
| JP | 2020064564 A | 4/2020 |
| WO | WO-2019231844 A1 | 12/2019 |

OTHER PUBLICATIONS

Office Action received for Japanese Patent Application No. 2021-123645 dated Jun. 22, 2022, 6 pages.

Pomerantz et al., (2019). "Multi-mission, Interactive 3D Visualization in a Web Browser for Robotic System and Space Flight Mission Development and Operations," 2019 IEEE International Conference On Space Mission Challenges For Information Technology, 7 pages.

Yoshida et al., (2005). "Chapter 2: JavaServer Faces Basals," A Well-Known JavaServer Faces Mechanism, pp. 39-42, and 58, 12 pages.

Extended European Search Report received for European Patent Application No. 21184604.3 dated Nov. 29, 2021, 12 pages.

Mujika et al., (2019). "Web-based Video-Assisted Point Cloud Annotation for ADAS validation," the 24th international conference on 3D web technology on WEB3D '19, 9 pages.

* cited by examiner

ANNOTATION TOOL GENERATION METHOD, ANNOTATION METHOD, ELECTRONIC DEVICE AND STORAGE MEDIUM

CROSS-REFERENCE TO RELATED APPLICATION

This application claims priority to Chinese patent application No. 202011446312.7, filed on Dec. 11, 2020, which is hereby incorporated by reference in its entirety.

TECHNICAL FIELD

The present disclosure relates to the technical field of computers, and in particular to the technical field of artificial intelligence such as automatic driving, intelligent transportation, computer vision, deep learning and the like.

BACKGROUND

Data annotation is very common in the fields such as artificial intelligence, deep learning and the like. In a scene that a model is required to be used in automatic driving, computer vision and the like, the data annotation is also a task that an operator often needs to face. In the training stage of a model, the training data of the model needs to be annotate, a model to be trained is trained by using the annotated training data, to generate a trained model.

SUMMARY

The present disclosure provides an annotation tool generation method, an annotation method, an apparatus, a device and a storage medium.

According to one aspect of the present disclosure, there is provided an annotation tool generation method, including:

acquiring a first function module generated based on a first language, wherein the first function module is configured for acquiring a file to be annotated;

acquiring a second function module generated based on a second language;

converting the second function module into a third function module in a webpage-oriented binary format (WebAssembly), wherein the third function module is configured for presenting the file to be annotated on an annotation page and displaying an annotation result corresponding to the file to be annotated on the annotation page; and generating an annotation tool based on the first function module and the third function module.

According to another aspect of the present disclosure, there is provided an annotation method, including:

calling an annotation tool;

invoking a file to be annotated from a server by a first function module of the annotation tool, wherein the first function module is generated in a first language;

presenting the file to be annotated on an annotation page based on a third function module of the annotation tool, wherein the third function module is, in a webpage-oriented binary format, converted from a second function module in a second language; and displaying, in a case where an annotation result for the file to be annotated is acquired, the annotation result for the file to be annotated on the annotation page based on the third function module of the annotation tool.

According to another aspect of the present disclosure, there is provided an annotation tool generation apparatus, including:

a first function module generation module configured for acquiring a first function module generated based on a first language, wherein the first function module is configured for acquiring a file to be annotated;

a second function module acquisition module configured for acquiring a second function module generated based on a second language;

a conversion module configured for converting the second function module into a third function module in a webpage-oriented binary format, wherein the third function module is configured for presenting the file to be annotated on an annotation page and displaying an annotation result corresponding to the file to be annotated on the annotation page; and a generation module configured for generating an annotation tool based on the first function module and the third function module.

According to another aspect of the present disclosure, there is provided an annotation apparatus, including:

a calling module configured for calling an annotation tool;

an invoking module configured for invoking a file to be annotated from a server by a first function module of the annotation tool, wherein the first function module is generated in a first language;

a presentation module configured for presenting the file to be annotated on an annotation page based on a third function module of the annotation tool, wherein the third function module is, in a webpage-oriented binary format, converted from a second function module in a second language; and a result module configured for displaying, in a case where an annotation result for the file to be annotated is acquired, the annotation result for the file to be annotated on the annotation page based on the third function module of the annotation tool.

According to another aspect of the present disclosure, there is provided an electronic device, including:

at least one processor; and a memory communicatively connected with the at least one processor, wherein the memory stores instructions executable by the at least one processor, the instructions being executed by the at least one processor to enable the at least one processor to perform the method according to any one of the embodiments of the present disclosure.

According to another aspect of the present disclosure, there is provided a non-transitory computer-readable storage medium storing computer instructions for enabling a computer to perform the method according to any one of the embodiments of the present disclosure.

According to another aspect of the present disclosure, there is provided a computer program product including computer instructions which, when executed by a processor, cause the processor to perform the method according to any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
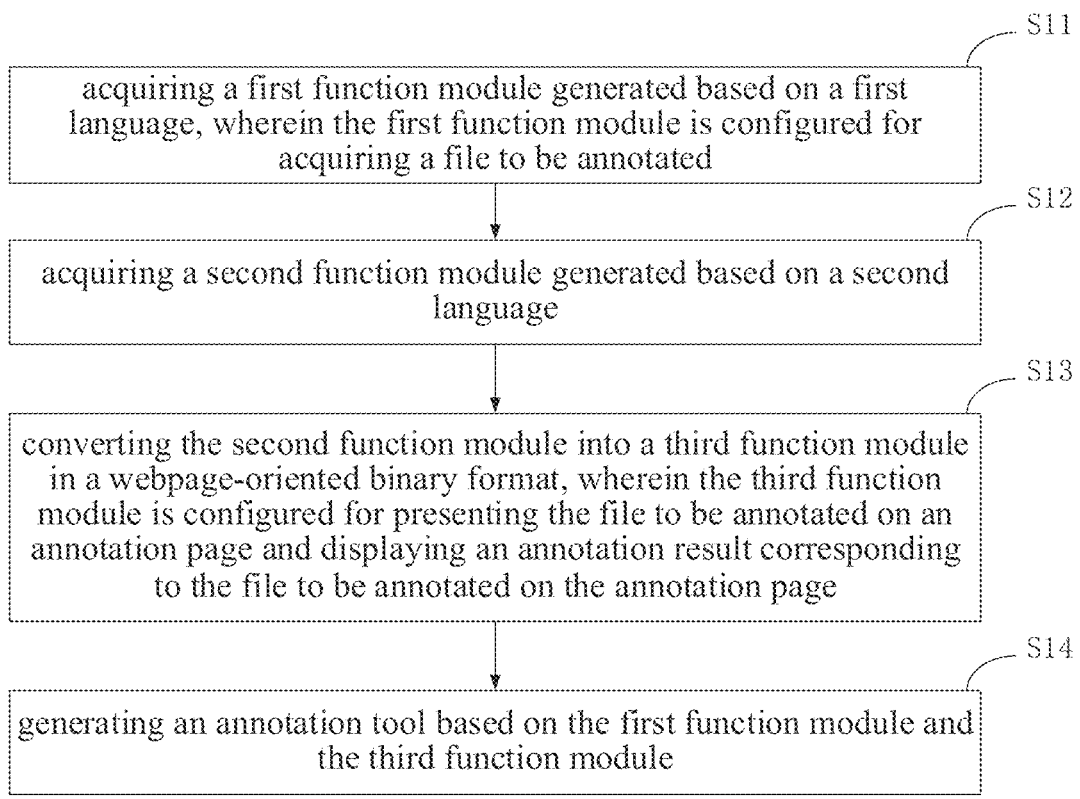
FIG. 1 is a schematic diagram of an annotation tool generation method according to an embodiment of the present disclosure.

An embodiment of the present disclosure firstly provides an annotation tool generation method, and as shown in FIG. 1, the annotation tool generation method may include:

S11: acquiring a first function module generated based on a first language, wherein the first function module is configured for acquiring a file to be annotated;

S12: acquiring a second function module generated based on a second language;

S13: converting the second function module into a third function module in a webpage-oriented binary format, wherein the third function module is configured for presenting the file to be annotated on an annotation page and displaying an annotation result corresponding to the file to be annotated on the annotation page; and S14: generating an annotation tool based on the first function module and the third function module.

According to the embodiment of the present disclosure, the annotation module written in the second language is translated into a core annotation module in a webpage-oriented binary format, so that the language translation can be performed by utilizing a mature annotation algorithm, and meanwhile, the specific content of the mature annotation algorithm can be protected.

In the embodiment, the first function module may be a business logic module, for acquiring a file to be annotated from a server side. The third function module may be a core annotation module, for presenting the file to be annotated and the annotation information on the annotation page, and acquiring the annotation result by the annotation page.

The second function module generated in the second language may be an annotation module contained in a known algorithm library, or may be a non-known annotation module.

In this embodiment, the acquiring the first function module generated based on the first language may specifically include: generating the first function module, according to a writing operation in the first language input by an operator.

The acquiring the first function module generated based on the first language may specifically include: generating the first function module, according to an operation that the operator calls a program template edited in the first language in advance and an editing operation to the program template in the first language.

In this embodiment, the first language may be different from the second language. For example, the first language may be a common computer language, and the second language may be a more specialized computer language. The second language may be a language in which web pages are less compatible, and the first language may be a language in which web pages are more compatible.

In the embodiment, the first function module may be written in JavaScript, and may be configured for:

acquiring an annotation task from a server through an Hyper Text Transmit Protocol (HTTP) and downloading a file to be annotated;

sending, to a core annotation module, an instruction for loading a point cloud, via an interface with the core annotation module;

obtaining a current annotation result from the core annotation module via the interface with the core annotation module, wherein the current annotation result includes annotation information such as a size, a position, a direction, an attribute and the like of each annotation box;

submitting the current annotation result to a server side through the HTTP protocol, after an operator finishes the annotation to the file to be annotated; and receiving a callback of the core annotation module, to enable the first function module to display a 2D auxiliary image and a projection box on the annotation page.

Figure 3:
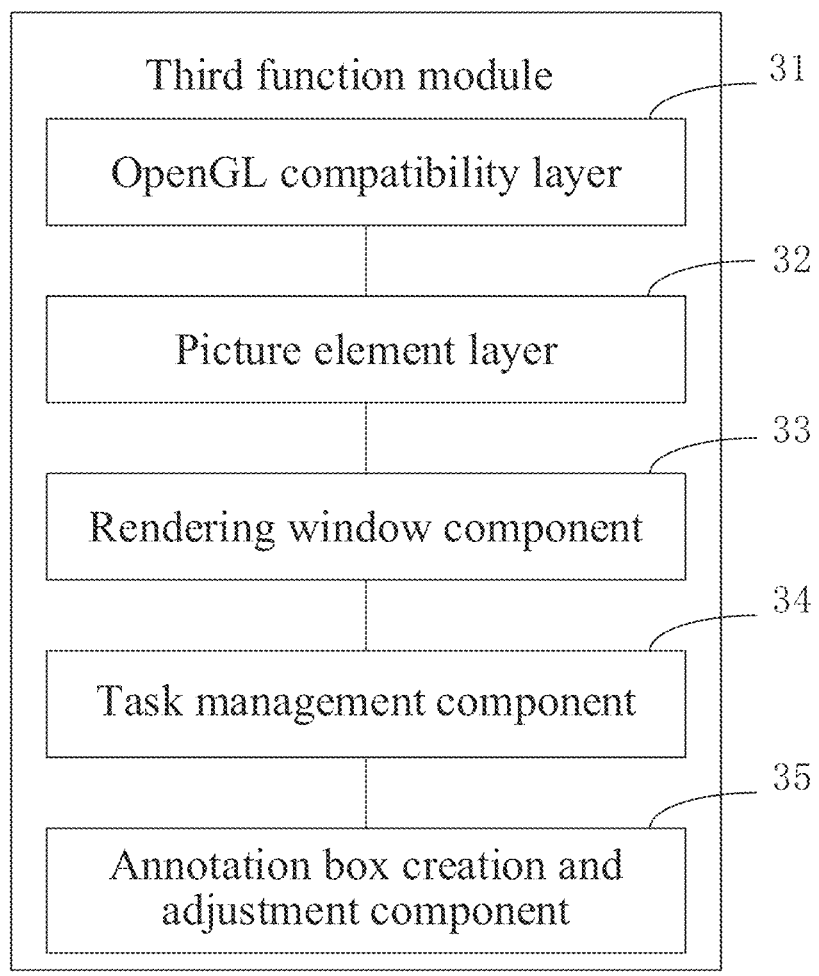
FIG. 3 is a schematic diagram of an annotation tool according to an embodiment of the present disclosure.

In this embodiment, the third function module may be written using C++, compiled into WebAssembly for use by a Web browser. In one implementation, the third function module may include a structure shown in FIG. 3:

OpenGL (Open Graphic Library) compatibility layer 31: the desktop OpenGL API (OpenGL Application Programming Interface) may be translated into WebGL (Web Graphic Library), and the C++ part may be developed directly using OpenGL.

Figure 4:
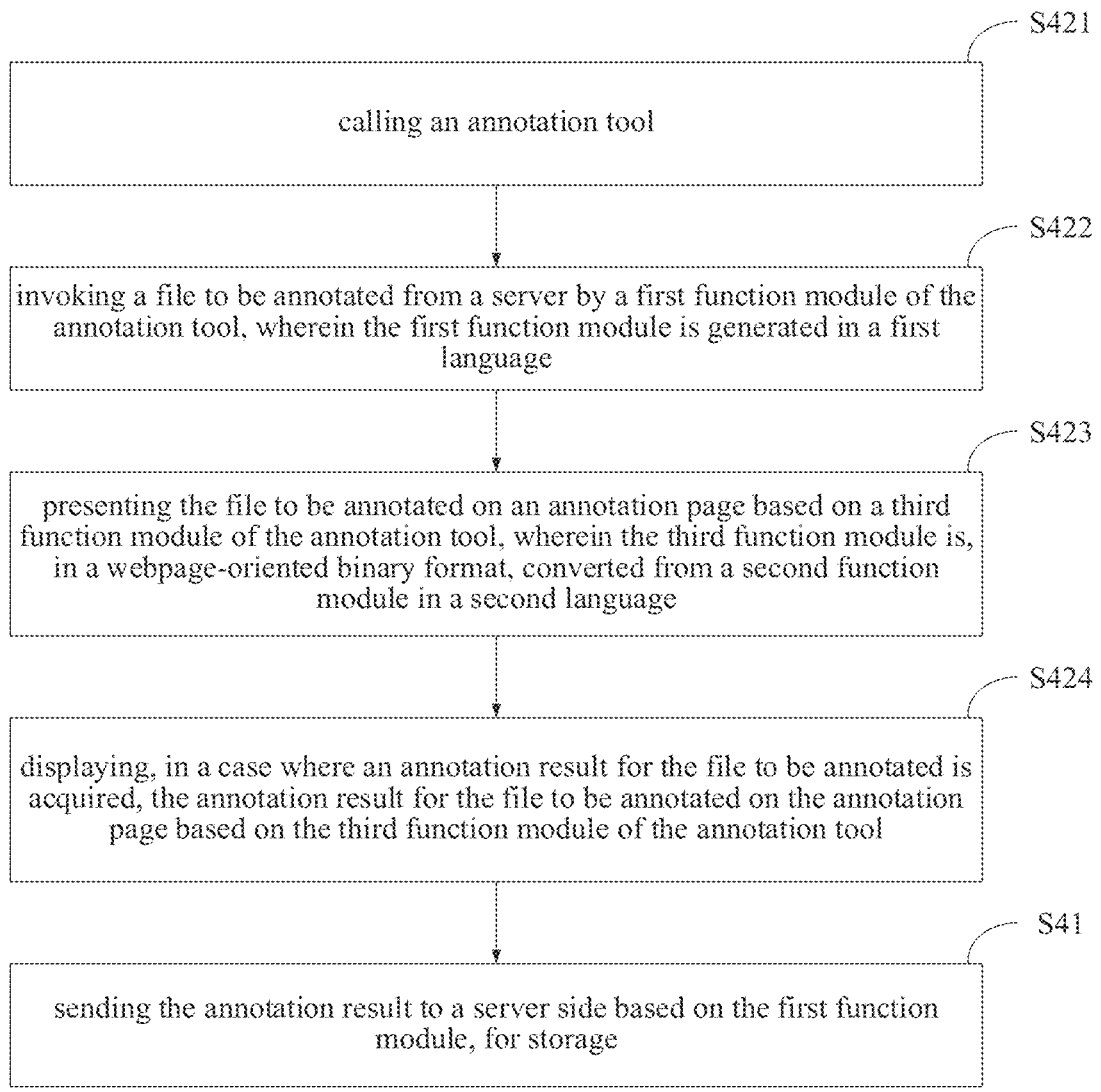
FIG. 4 is a schematic diagram of an annotation method according to another embodiment of the present disclosure.

Picture element layer 32: each picture element in the annotation picture is abstracted, and each picture element is organized in a tree-shaped manner Picture elements include point clouds, cubes (annotation boxes), spheres, cylinders, etc. The picture elements may be organized as shown in FIG. 4. Meanwhile, the drawing operation of the picture elements is performed by the OpenGL interface, to realize the drawing of various individual picture elements.

Rendering window component 33: the rendering function of the annotation picture as a whole is realized, and the annotation elements organized in a tree form are called in a depth-first traversal mode, to render the whole picture.

Meanwhile, events such as a mouse operation, a window size change and the like of a keyboard of a user are received through a Simple DirectMedia Layer (SDL) library, and the events are sent to other components of the core annotation module.

Task management component 34: an external interface is provided to a business logic module, wherein the external interface includes loading a point cloud, outputting an annotation result and the like.

Annotation box creation and adjustment component 35: an annotation box is created and adjusted according to the instructions of creating a box, adjusting the size of the box, adjusting the position of the box, adjusting the attribute of the box and the like received from the user, and the annotation box is stored in the picture element layer. In a case where the annotation box is created and adjusted, PCL (Point Cloud Library), a mature algorithm library in the industry such as Eigen (a linear arithmetic C++ template library) and the like may be used to achieve some intelligent functions improving the efficiency of user annotation.

An operator may call the interface of the core annotation module by clicking buttons such as building a new box, adjusting the box and the like on the annotation page of the browser, to send a corresponding instruction to the core annotation module.

In this embodiment, the second function module written in the second language is translated into a third function module in a webpage-oriented binary format, so that the language translation can be performed by utilizing a mature annotation algorithm, and meanwhile, specific codes of the mature annotation algorithm can be protected.

In one implementation, an annotation tool generation method may further include:

translating a graphic interface in an open graphic library format into a graphic interface in a webpage graphic library format; and adding the graphic interface in the webpage graphic library format to the third function module.

In this embodiment, the translating the graphic interface in the open graphic library format into the graphic interface in the webpage graphic library format may specifically include: translating the graphic interface in the open graphic library format into the graphic interface in the webpage graphic library format, according to the translation operation of the operator.

Alternatively, the graphic interface in the open graphic library format is input into a translation module, and translated into the graphic interface in the webpage graphic library format.

In this embodiment, the standard adopted by the graphic interface in the webpage graphic library format can be compatible with the webpage and the third function module written in the second language and converted into the webpage-oriented binary format, so that information transmission can be performed between the annotation page at the front end and the third function module.

In this embodiment, the graphic interface in the open graphic library format is translated into the graphic interface in the webpage graphic library format, so that the third function module can perform information interaction with the front-end webpage via the interface, and detect the event generated by the annotation operation.

In one implementation, the first language is JavaScript, and the second language is C++.

For the C++ language development, the user interface is more complex, and development cost is higher, but the intellectual property protection function is stronger.

JavaScript source codes may be obtained directly from a browser, and may be roughly understood even after confusion. It has poor confidentiality and is not conducive to protecting specific code content, but the code is simple and easy to write.

In this embodiment, the first language is JavaScript, so that the part with low confidentiality requirement is written in a simple and changeable language, the code writing difficulty is reduced, and the portability of the annotation tool is improved; and the second language is C++, so that the mature algorithm of C++ may be utilized, and the specific content of the mature algorithm is protected, making it hard to be stolen.

Figure 2:
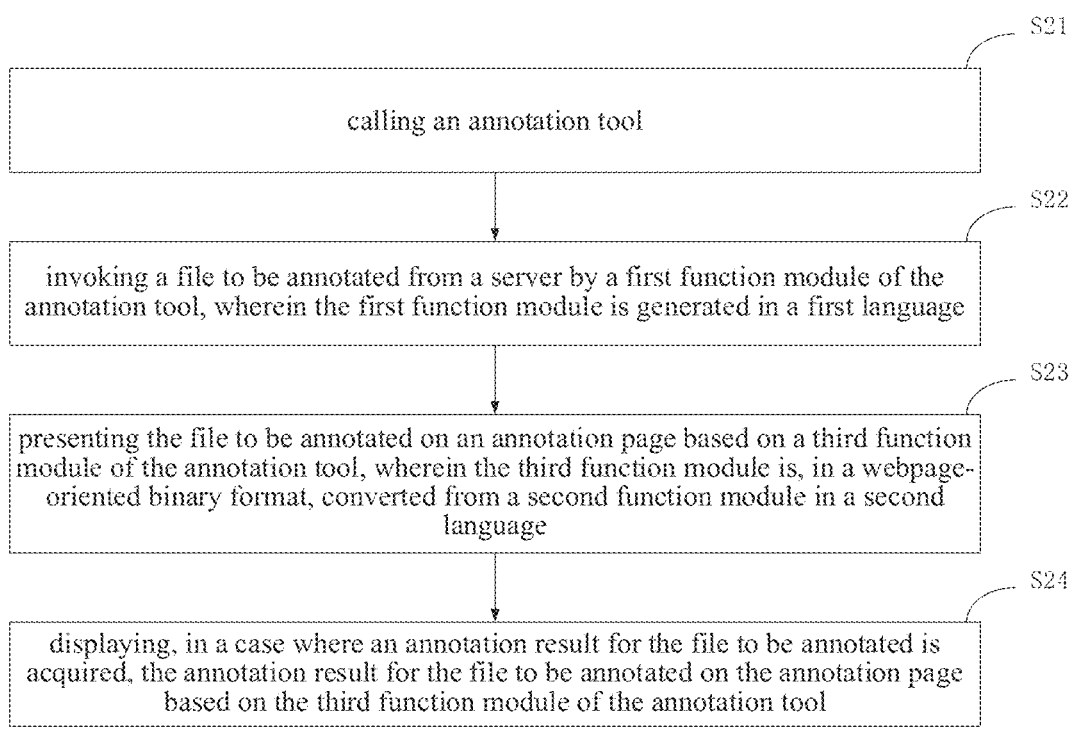
FIG. 2 is a schematic diagram of an annotation tool generation method according to another embodiment of the present disclosure.

An embodiment of the present disclosure also provides an annotation method. As shown in FIG. 2, the annotation method may include:

S21: calling an annotation tool, wherein the annotation tool may be an annotation tool generated by the annotation tool generation method provided by any embodiment of the present disclosure;

S22: invoking a file to be annotated from a server by a first function module of the annotation tool, wherein the first function module is generated in a first language;

S23: presenting the file to be annotated on an annotation page based on a third function module of the annotation tool, wherein the third function module is, in a webpage-oriented binary format, converted from a second function module in a second language; and S24: displaying, in a case where an annotation result for the file to be annotated is acquired, the annotation result for the file to be annotated on the annotation page based on the third function module of the annotation tool.

The calling an annotation tool may specifically include: opening an annotation page via a browser, based on a received annotation page opening instruction; and calling an annotation tool by the annotation page.

The above annotation page opening instruction may be a webpage opening instruction issued by an operation such as a clicking operation or the like.

The annotation page may be a web page accessible via a browser.

The presenting the file to be annotated on the annotation page by the annotation tool may include: calling the file to be annotated from the server by the annotation tool, and presenting the file to be annotated on the annotation page in a manner visible to an operator.

In this embodiment, before the file to be annotated is annotated, the file to be annotated may be presented on the annotation page. After the annotation information is generated, the file to be annotated and the annotation information may be presented on the annotation page.

In the automatic driving technology, a common way for identifying surrounding objects (motor vehicles, non-motor vehicles, obstacles, pedestrians and the like) by an autonomous vehicle is to collect three-dimensional point cloud data of the surrounding objects of the vehicle by laser radar detection, and then identify the three-dimensional point cloud data by using deep learning and Deep Neural Network (DNN) technologies. The deep learning technology usually requires a large number of training samples to train the model. The sample data for training a deep learning model is usually annotated manually after being collected by a collecting vehicle in a real environment. The file to be annotated in an embodiment of the present disclosure may be a file to be annotated related to the three-dimensional point cloud, and particularly may include data such as a point cloud file, an auxiliary image file, camera parameters and the like.

In an embodiment of the present disclosure, the annotation tool generated by the embodiment of any annotation tool generation method of the present disclosure is used for annotating a file to be annotated, thus a mature annotation algorithm may be utilized, the specific contents of the mature algorithm can be protected, so that the problem of code leakage is avoided, and meanwhile, the annotation tool is strong in portability and high intelligence.

In one implementation, the presenting the file to be annotated on the annotation page based on the third function module of the annotation tool may include:

rendering the file to be annotated based on the third function module, to generate a displayable picture of the file to be annotated; and presenting the displayable picture of the file to be annotated via the annotation page based on a graphic interface of the third function module.

The first function module may be a business logic module, and in an embodiment of the present disclosure, the file to be annotated may be called from the server side by the business logic module. The method may specifically include: sending an acquisition request for a file to be annotated to a server side by the business logic module, and receiving the file to be annotated sent by the server side.

The rendering the file to be annotated by the core annotation module, to generate the displayable picture may specifically include: generating the displayable picture from the content of the file to be annotated, by rendering a shape, an element and the like in the picture by the core annotation module.

In this embodiment, the file to be annotated is called from the server side by the first function module written in the first language, and then the picture of the file to be annotated is presented by the third function module, so that an operator can view the file to be annotated through a webpage. Meanwhile, the file to be annotated may be annotated by using an algorithm with a complete function, so that the protection function of the annotation tool on the code content can be enhanced, and the operation convenience of the operator can also be improved.

In one implementation, the rendering the file to be annotated, to generate a displayable picture of the file to be annotated may include:

generating an element tree of the picture of the file to be annotated based on the file to be annotated;

drawing an element of the displayable picture of the file to be annotated based on the element tree of the picture of the file to be annotated; and generating the displayable picture of the file to be annotated based on the element of the displayable picture of the file to be annotated.

The element tree of a picture may include a node of an element of the picture, e.g., a picture may include elements A, B, C and D, A may include sub-elements A1, A2 and A3, B may include sub-elements B1 and B2, C may include sub-elements C1, C2 and C3, and D may include sub-elements D1 and D2.

The drawing the element of the displayable picture based on the element tree may specifically include: drawing a layer of each element based on the element tree. It may also include drawing a layer of a sub-element at each level based on the element tree. It may also include drawing a separate graphic corresponding to each element or sub-element based on the element tree.

In this embodiment, the displayable picture is generated based on the file to be annotated, so that the content to be annotated can be presented to an operator, thus the operator can view the content to be annotated.

In one implementation, the displaying, in the case where the annotation result for the file to be annotated is acquired, the annotation result for the file to be annotated on the annotation page based on the third function module of the annotation tool may include:

generating annotation information for the file to be annotated based on an operation event generated on the annotation page by an input device detected by the third function module;

adding the annotation information for the file to be annotated to the element of the displayable picture based on the third function module; and generating the annotation result for the file to be annotated based on the third function module, according to the element of the displayable picture of the file to be annotated.

The input device may specifically include an input device attached to a terminal, such as a mouse, a keyboard, a touch pad, etc.

The operation event generated by the input device on the annotation page may specifically include a line input operation, a box input operation, a text input operation, a digital input operation and the like.

The annotation information may specifically include information such as a size, a position, a direction, an attribute, a specific content and the like of an annotation content such as an annotation box, a character, a digit and the like.

The adding the annotation information to the element may refer to rendering a picture according to the annotation information and the file to be annotated, to generate a new displayable picture; or updating the displayable picture according to the annotation information. It may also include: rendering according to the annotation information, to generate new display information of the displayable picture, and adding the new display information to the corresponding element according to a position where the operation event occurs.

The generating the annotation result according to the element added with the annotation information may specifically include: updating the file to be annotated according to the annotation information, and generating the annotation result after the content to be annotated is annotated.

In this embodiment, the annotation information is generated according to the operation event, and the annotation result is generated according to the annotation information, so that a sample for training a model can be generated according to the annotation result.

In one implementation, as shown in FIG. 4, the annotation method may further include:

S41: sending the annotation result to a server side based on the first function module, for storage.

S421, S422, S423 and S424 shown in FIG. 4 are operations same as or similar to S21, S22, S23 and S24 shown in FIG. 2, respectively.

In this embodiment, the current annotation result may be temporarily stored in the server side through the HTTP protocol.

In an embodiment of the present disclosure, the annotation result is sent to the server for storage, so that data for training a model may be conveniently generated according to the annotation result.

In one example of the present disclosure, the annotation tool and the annotation method may be applied to annotation of a point cloud file, and a point cloud annotation tool based on a Web is provided. HTML, Cascading Style Sheets (CSS) and JavaScript are used to implement a user operation interface and a business logic, and C++ is used to implement 3D point cloud rendering and annotation functions. The 3D point cloud rendering annotation component implemented by C++ is compiled into WebAssembly, to combine the two.

An embodiment of the present disclosure may be applied to the technical field of artificial intelligence such as automatic driving, intelligent transportation, computer vision, deep learning and the like.

Figure 5:
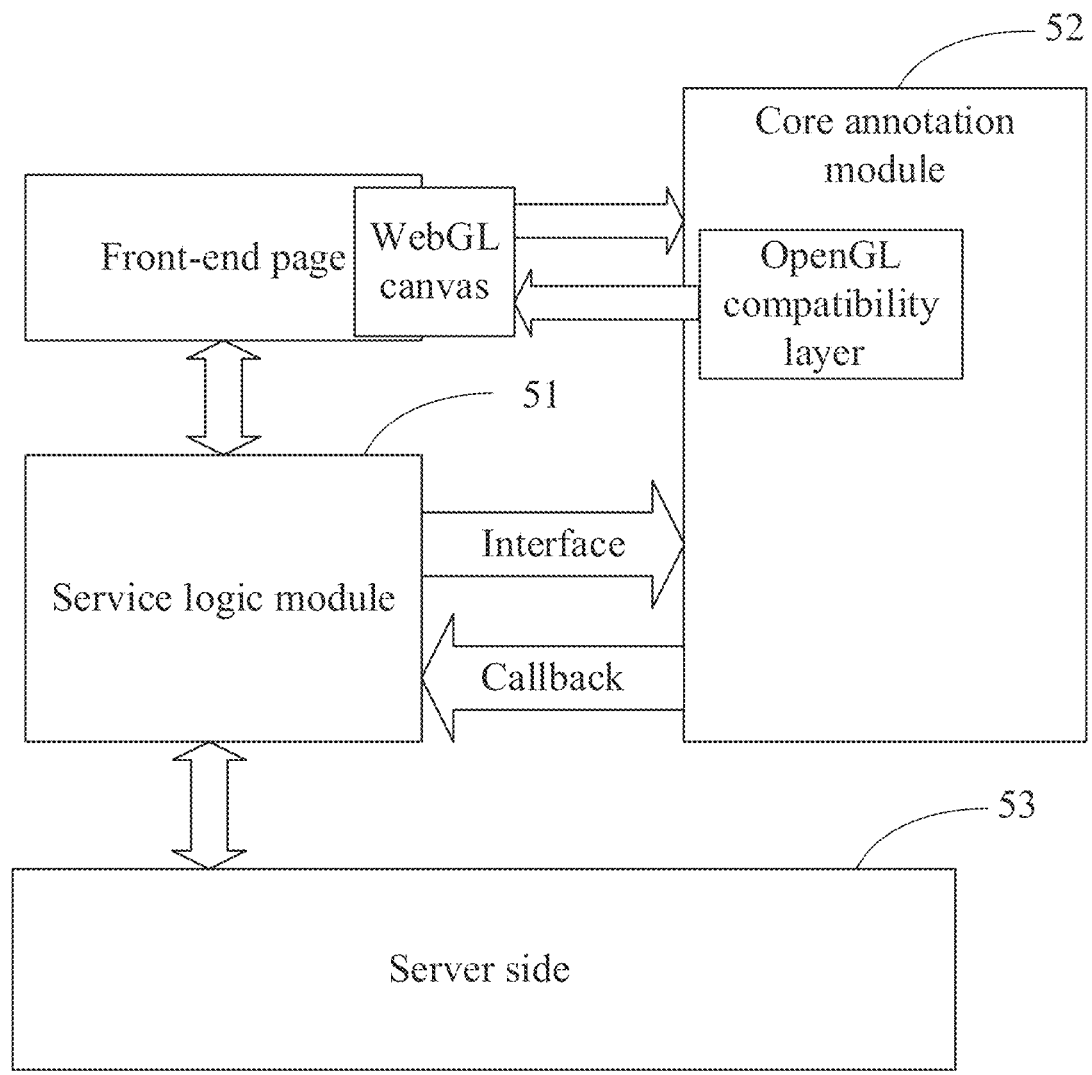
FIG. 5 is a schematic diagram of an annotation tool according to another embodiment of the present disclosure.

In this example, the composition and structure of the annotation tool is shown in FIG. 5, including a business logic module 51 (equivalent to the first function module) written in JavaScript, and a core annotation module 52 written in C++ and translated into a WebAssembly format (equivalent to the third function module in the WebAssembly format converted by the second function module generated in C++). The core annotation module 52 may include an OpenGL interface translated into a WebGL format, and may transmit a picture to a front-end page for display, receive an operation event for a mouse, a keyboard and the like, and acquire annotation information according to the operation event. The front-end page of the client may be a Web page written using HTML and CSS, including a Canvas for rendering of point clouds and annotation boxes. The core annotation module 52 may send an annotation result to the business logic module 51 via an interface between the core annotation module 52 and the business logic module 51, so that the business logic module 51 may send the annotation result to the server side 53. The front-end page shown in FIG. 5 may refer to a browser page for presenting a annotation page to an operator.

Figure 6:
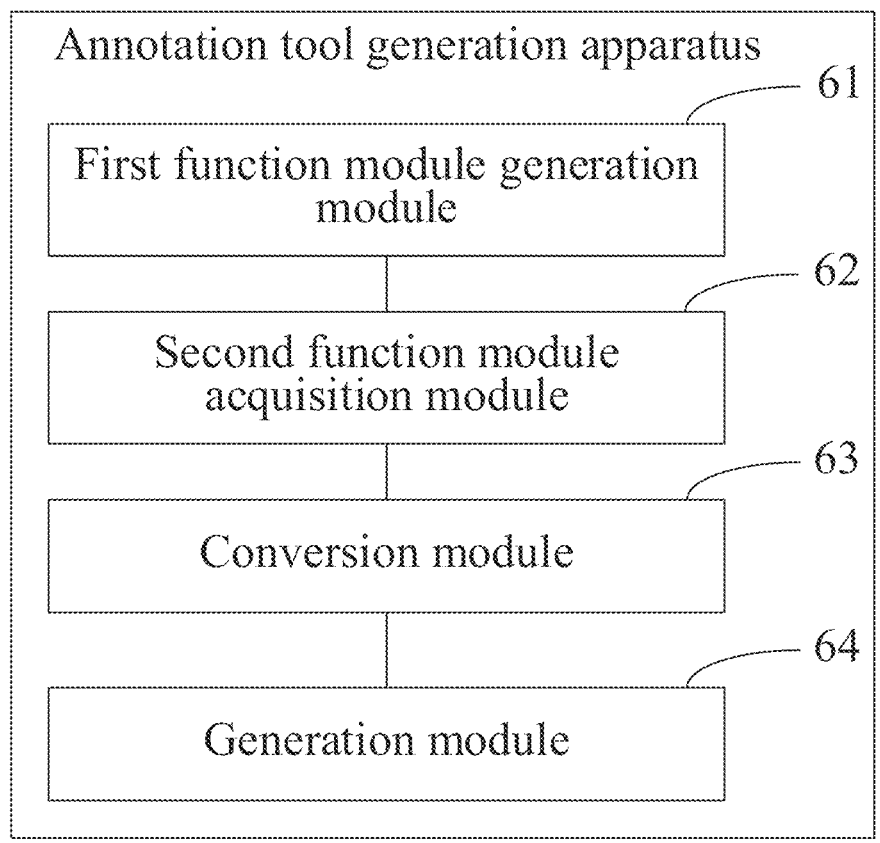
FIG. 6 is a schematic diagram of an annotation tool generation apparatus according to an embodiment of the present disclosure.

An embodiment of the present disclosure also provides an annotation tool generation apparatus. As shown in FIG. 6, the annotation tool generation apparatus may include:

a first function module generation module 61 configured for acquiring a first function module generated based on a first language, wherein the first function module is configured for acquiring a file to be annotated;

a second function module acquisition module 62 configured for acquiring a second function module generated based on a second language;

a conversion module 63 configured for converting the second function module into a third function module in a webpage-oriented binary format, wherein the third function module is configured for presenting the file to be annotated on an annotation page and displaying an annotation result corresponding to the file to be annotated on the annotation page; and a generation module 64 configured for generating an annotation tool based on the first function module and the third function module.

Figure 7:
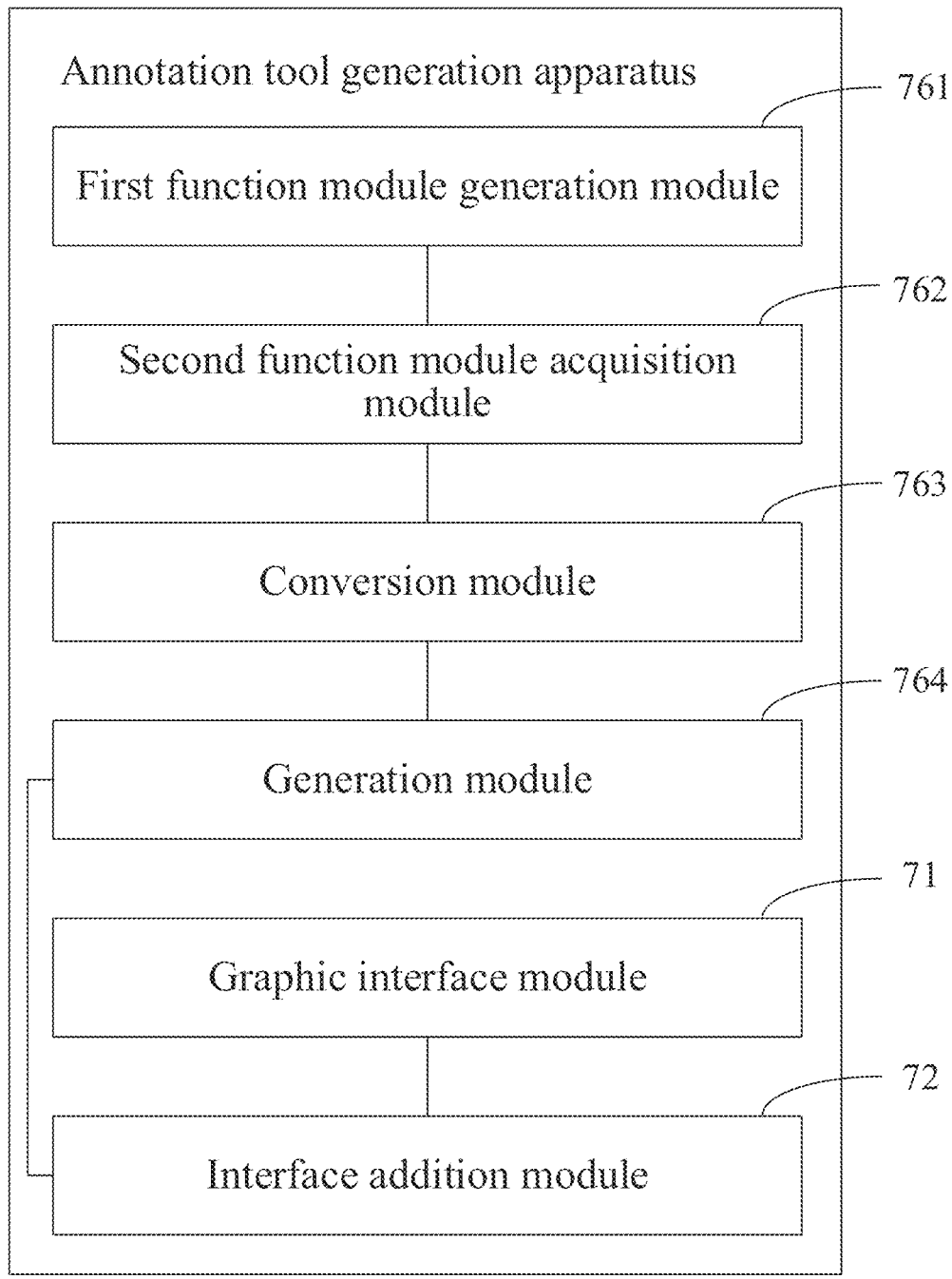
FIG. 7 is a schematic diagram of an annotation tool generation apparatus according to another embodiment of the present disclosure.

In one implementation, as shown in FIG. 7, the annotation tool generation apparatus may further include:

a graphic interface module 71 configured for converting a graphic interface in an open graphic library format into a graphic interface in a webpage graphic library format; and an interface addition module 72 configured for adding the graphic interface in the webpage graphic library format to the third function module.

A first function module generation module 761, a second function module acquisition module 762, a conversion module 763 and a generation module 764 shown in FIG. 7 are modules same as or similar to the first function module generation module 61, the second function module acquisition module 62, the conversion module 63 and the generation module 64 shown in FIG. 6, respectively.

In one implementation, the first language may be JavaScript, and the second language may be C++.

Figure 8:
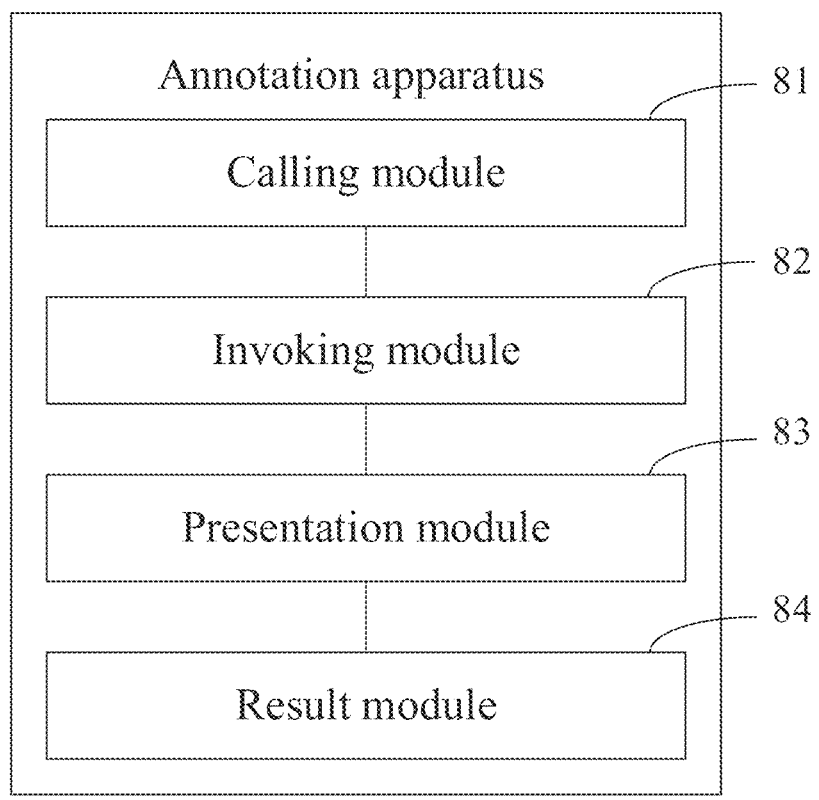
FIG. 8 is a schematic diagram of an annotation apparatus according to another embodiment of the present disclosure.

An embodiment of the present disclosure also provides an annotation apparatus. As shown in FIG. 8, the annotation apparatus may include:

a calling module 81 configured for calling an annotation tool;

an invoking module 82 configured for invoking a file to be annotated from a server by a first function module of the annotation tool, wherein the first function module is generated in a first language;

a presentation module 83 configured for presenting the file to be annotated on an annotation page based on a third function module of the annotation tool, wherein the third function module is, in a webpage-oriented binary format, converted from a second function module in a second language; and a result module 84 configured for displaying, in a case where an annotation result for the file to be annotated is acquired, the annotation result for the file to be annotated on the annotation page based on the third function module of the annotation tool.

Figure 9:
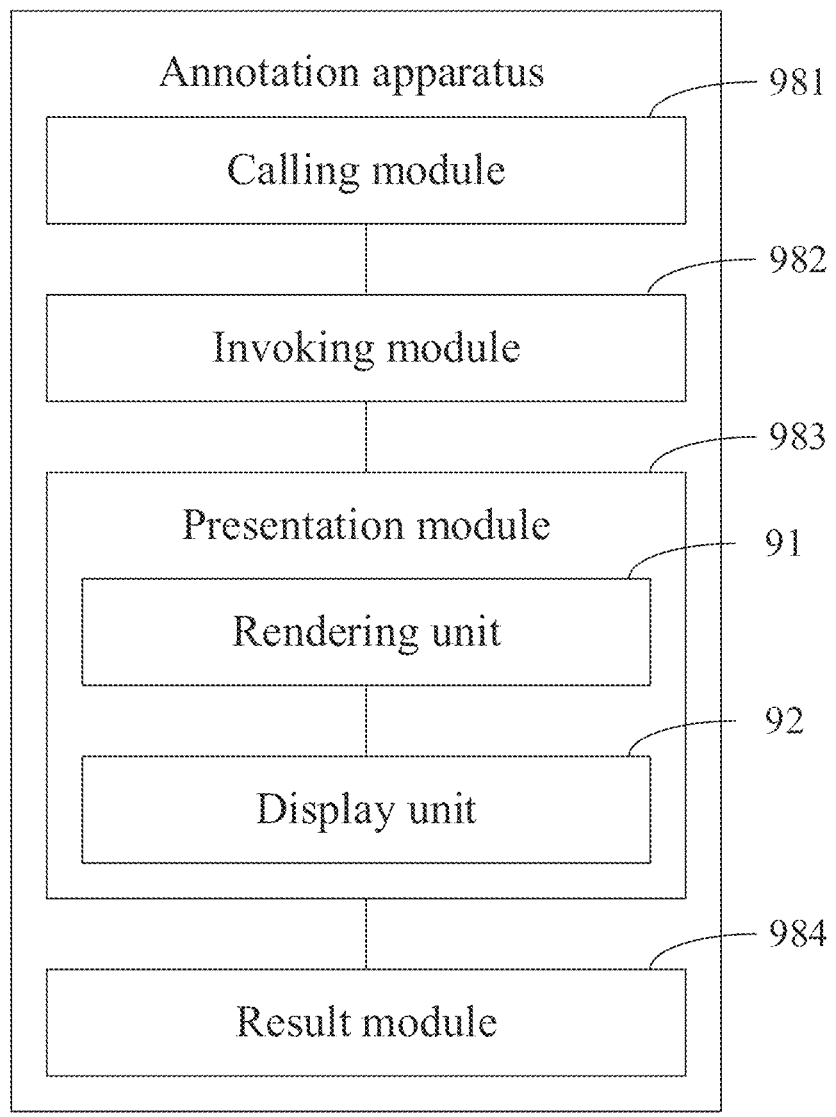
FIG. 9 is a schematic diagram of an annotation apparatus according to another embodiment of the present disclosure.

In one implementation, as shown in FIG. 9, the presentation module 983 may further include:

a rendering unit 91 configured for rendering the file to be annotated based on the third function module, to generate a displayable picture of the file to be annotated; and a display unit 92 configured for presenting the displayable picture of the file to be annotated via the annotation page based on a graphic interface of the third function module.

A calling module 981, a invoking module 982, the presentation module 983 and a result module 984 shown in FIG. 9 are modules same as or similar to the calling module 81, the invoking module 82, the presentation module 83 and the result module 84 shown in FIG. 8, respectively.

In one implementation, the rendering unit may further be configured for:

generating an element tree of the picture of the file to be annotated based on the file to be annotated;

drawing an element of the displayable picture of the file to be annotated based on the element tree of the picture of the file to be annotated; and generating the displayable picture of the file to be annotated based on the element of the displayable picture of the file to be annotated.

Figure 10:
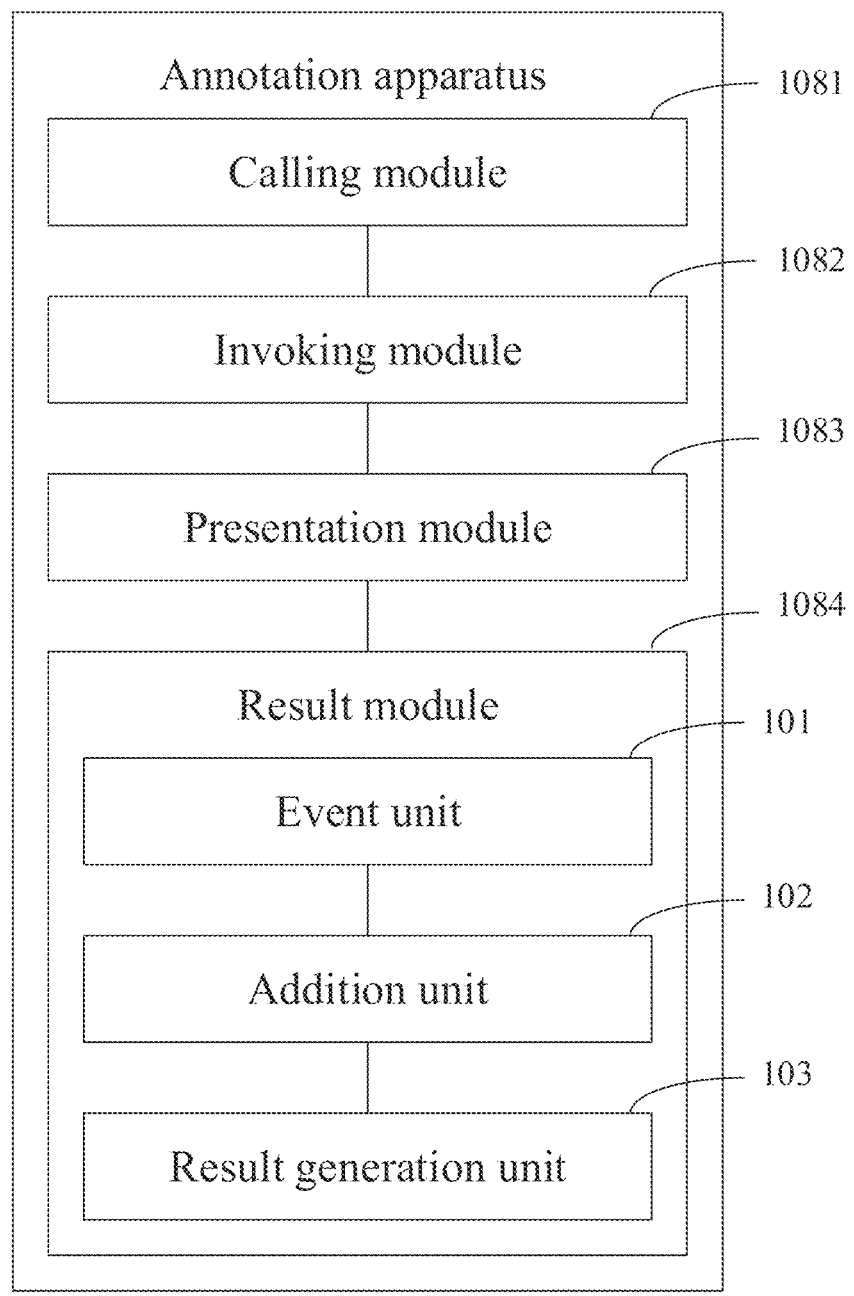
FIG. 10 is a schematic diagram of an annotation apparatus according to another embodiment of the present disclosure.

In one implementation, as shown in FIG. 10, the result module 1084 may include:

an event unit 101 configured for generating annotation information for the file to be annotated based on an operation event generated on the annotation page by an input device detected by the third function module;

an addition unit 102 configured for adding the annotation information for the file to be annotated to the element of the displayable picture based on the third function module; and a result generation unit 103 configured for generating the annotation result for the file to be annotated based on the third function module, according to the element of the displayable picture of the file to be annotated.

A calling module 1081, a invoking module 1082, a presentation module 1083 and the result module 1084 shown in FIG. 10 are modules same as or similar to the calling module 81, the invoking module 82, the presentation module 83 and the result module 84 shown in FIG. 8 or the calling module 981, the invoking module 982, the presentation module 983 and the result module 984 shown in FIG. 9, respectively.

Figure 11:
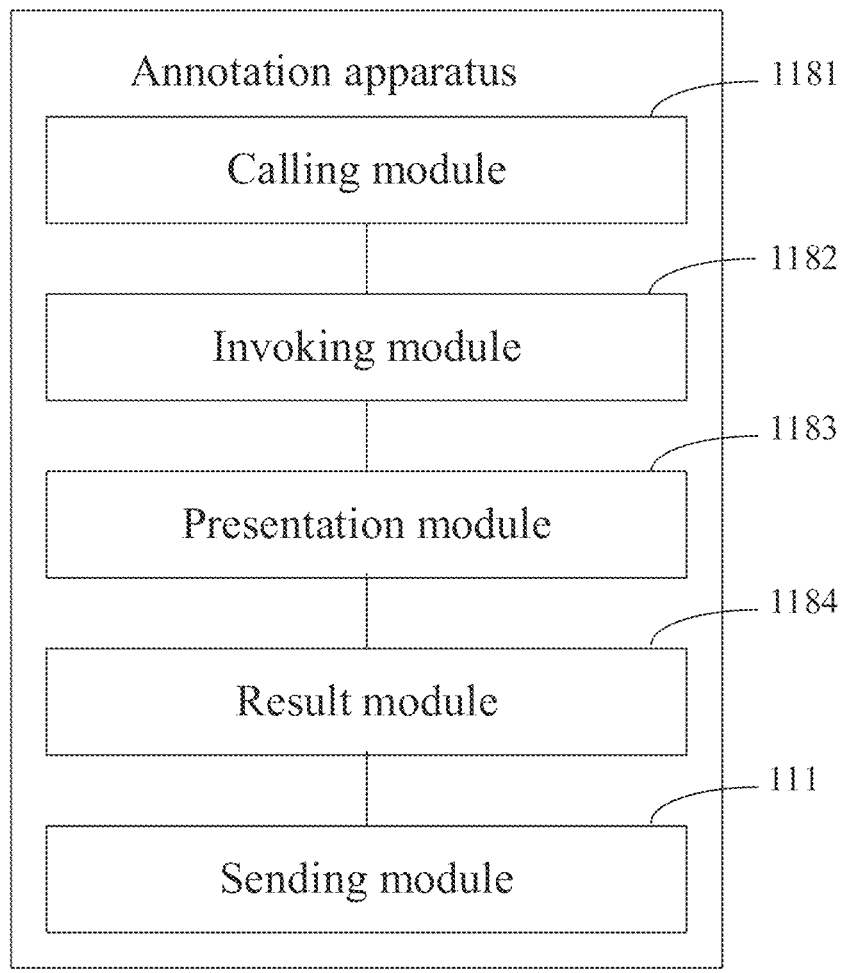
FIG. 11 is a schematic diagram of an annotation apparatus according to another embodiment of the present disclosure.

In one implementation, as shown in FIG. 11, the annotation apparatus may further include:

a sending module 111 configured for sending the annotation result to a server side based on the first function module, for storage.

A calling module 1181, a invoking module 1182, a presentation module 1183 and a result module 1184 shown in FIG. 11 are modules same as or similar to the calling module 81, the invoking module 82, the presentation module 83 and the result module 84 shown in FIG. 8, the calling module 981, the invoking module 982, the presentation module 983 and the result module 984 shown in FIG. 9, or the calling module 1081, the invoking module 1082, the presentation module 1083 and the result module 1084 shown in FIG. 10, respectively.

The embodiments of the present disclosure can effectively solve the defects that annotation tools developed by traditional client-side manners are poor in portability, and need to be downloaded independently. An operator can work only by a Web browser. Meanwhile, a standard algorithm library in the industry may be easily utilized by combining the traditional client-side tool through the WebAssembly, to realize the intelligentized algorithm and improve the annotation efficiency, and also the problem that Javascript codes are easy to leak can be avoided, facilitating the protection of intellectual property.

According to embodiments of the present disclosure, the present disclosure also provides an electronic device and a readable storage medium.

Figure 12:
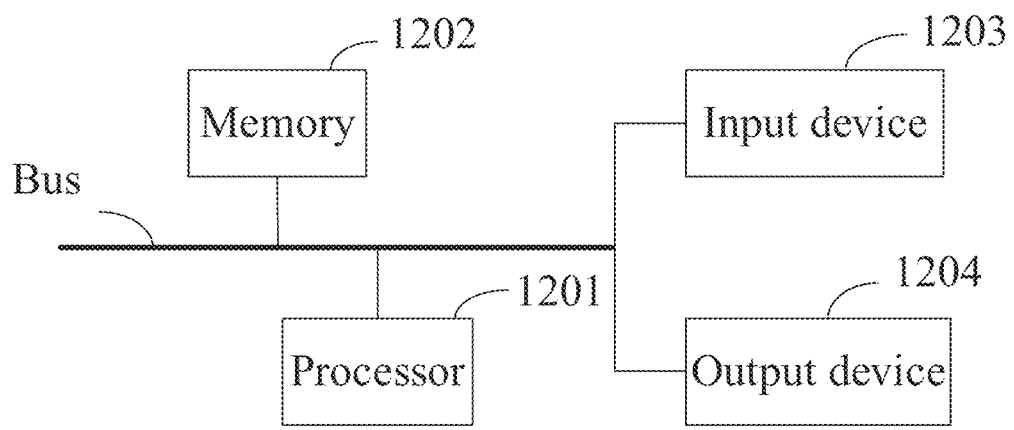
FIG. 12 is a block diagram of an electronic device used to implement an annotation tool generation method according to an embodiment of the present disclosure.

FIG. 12 is a block diagram of an electronic device for implementing an annotation tool generation method according to an embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 12, the electronic device may include one or more processors 1201, a memory 1202, and interfaces for connecting the respective components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 1201 is shown in FIG. 12.

The memory 1202 is a non-transitory computer-readable storage medium provided by the present disclosure. The memory stores instructions executable by at least one processor to cause the at least one processor to perform the annotation tool generation method provided by the present disclosure. The non-transitory computer-readable storage medium of the present disclosure stores computer instructions for enabling a computer to perform the annotation tool generation method provided by the present disclosure.

The memory 1202, as a non-transitory computer-readable storage medium, may be configured to store non-transitory software programs, non-transitory computer-executable programs, and modules, such as program instructions/modules corresponding to the annotation tool generation method in the embodiments of the present disclosure (e.g., the first function module generation module 61, the second function module acquisition module 62, the conversion module 63, and the generation module 64 shown in FIG. 6). The processor 1201 executes various functional applications and data processing of the electronic device by running non-transient software programs, instructions and modules stored in the memory 1202, i.e., implementing the annotation tool generation method in the method embodiment described above.

The memory 1202 may include a program storage area and a data storage area, wherein the program storage area may store an operating system, and an application program required for at least one function; and the data storage area may store data created according to the use of the annotation tool generation electronic device. In addition, the memory 1202 may include a high speed random access memory, and may also include a non-transitory memory, such as at least one disk storage device, a flash memory device, or other non-transitory solid state memory device. In some embodiments, the memory 1202 may optionally include memories remotely located relative to the processor 1201, which may be connected, via a network, to the annotation tool generation electronic device. Examples of such networks may include, but are not limited to, the Internet, an intranet, a local area network, a mobile communication network and combinations thereof.

The electronic device for the annotation tool generation method may further include an input device 1203 and an output device 1204. The processor 1201, the memory 1202, the input device 1203, and the output device 1204 may be connected by a bus or in other manners, and the bus connection is taken as an example in FIG. 12.

The input device 1203 may receive input digital or character information and generate a key signal input related to a user setting and a functional control of the annotation tool generation electronic device. For example, the input device may be a touch screen, a keypad, a mouse, a track pad, a touch pad, a pointer stick, one or more mouse buttons, a track ball, a joystick, and other input devices. The output device 1240 may include a display device, an auxiliary lighting device (e.g., a light emitting diode (LED)), a tactile feedback device (e.g., a vibrating motor), etc. The display device may include, but is not limited to, a liquid crystal display (LCD), an LED display, and a plasma display. In some embodiments, the display device may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other. The server may be a cloud server, also called as a cloud computing server or a cloud host, which is a host product in a cloud computing service system, to solve the defects of difficult management and weak business expansibility in the services of the traditional physical host and the virtual private server (VPS). The server may also be a server of a distributed system, or a server incorporating a blockchain.

According to the annotation tool and the annotation method provided by the embodiment of the present disclosure, the advantages of high portability and the like of an annotation page in a Web version are combined, the defect of writing all codes by completely using JavaScript is avoided, the intellectual property of the core algorithm can be protected, and the intelligentized annotation algorithm can be realized on a client side by using a mature algorithm library in the industry.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. An annotation tool generation method, comprising:
acquiring a first function module generated based on a first language, wherein the first function module is configured for acquiring a file to be annotated;
acquiring a second function module generated based on a second language;
converting the second function module into a third function module in a webpage-oriented binary format, wherein the third function module is configured for presenting the file to be annotated on an annotation page and displaying an annotation result corresponding to the file to be annotated on the annotation page, and wherein the third function module is written using C++, and the third function module comprises:
    Open Graphic Library compatibility layer, configured to translate a desktop Open Graphic Library Application Programming Interface into Web Graphic Library,
    picture element layer, configured to abstract each picture element in an annotation picture, and organize each picture element in a tree-shaped manner, wherein picture elements comprise point clouds, cubes or annotation boxes, spheres, and/or cylinders,
    rendering window component, configured to call, in a depth-first traversal mode, annotation elements organized in a tree form, so as to render a whole picture, receive events of a mouse and/or a keyboard operation of a user, and/or a window size change through a Simple DirectMedia Layer library, and send the events to other components of the third function module,
    task management component, configured to provide an external interface to the first function module, and
    annotation box creation and adjustment component, configured to create and adjust an annotation box according to instructions of creating a box, adjusting a size of the box, adjusting a position of the box, adjusting an attribute of the box received from the user, and store the annotation box in the picture element layer; and
generating an annotation tool based on the first function module and the third function module.

2. The method of claim 1, further comprising:
converting a graphic interface in an open graphic library format into a graphic interface in a webpage graphic library format; and
adding the graphic interface in the webpage graphic library format to the third function module.

3. The method of claim 1, wherein the first language is JavaScript, and the second language is C++.

4. An annotation method, comprising:
calling an annotation tool;
invoking a file to be annotated from a server by a first function module of the annotation tool, wherein the first function module is generated in a first language;
presenting the file to be annotated on an annotation page based on a third function module of the annotation tool, wherein the third function module is, in a webpage-oriented binary format, converted from a second function module in a second language, and wherein the third function module is written using C++,
and the third function module comprises:
Open Graphic Library compatibility layer, configured to translate a desktop Open Graphic Library Application Programming Interface into Web Graphic Library,
picture element layer, configured to abstract each picture element in an annotation picture, and organize each picture element in a tree-shaped manner, wherein picture elements comprise point clouds, cubes or annotation boxes, spheres, and/or cylinders,
rendering window component, configured to call, in a depth-first traversal mode, annotation elements organized in a tree form, so as to render a whole picture, receive events of a mouse and/or a keyboard operation of a user, and/or a window size change through a Simple DirectMedia Layer library, and send the events to other components of the third function module,
task management component, configured to provide an external interface to the first function module, and
annotation box creation and adjustment component, configured to create and adjust an annotation box according to instructions of creating a box, adjusting a size of the box, adjusting a position of the box, adjusting an attribute of the box received from the user, and store the annotation box in the picture element layer; and
displaying, in a case where an annotation result for the file to be annotated is acquired, the annotation result for the file to be annotated on the annotation page based on the third function module of the annotation tool.

5. The method of claim 4, wherein the presenting the file to be annotated on the annotation page based on the third function module of the annotation tool, comprises:
rendering the file to be annotated based on the third function module, to generate a displayable picture of the file to be annotated; and
presenting the displayable picture of the file to be annotated via the annotation page based on a graphic interface of the third function module.

6. The method of claim 5, wherein the rendering the file to be annotated based on the third function module, to generate the displayable picture of the file to be annotated, comprises:
generating an element tree of the picture of the file to be annotated based on the file to be annotated;
drawing an element of the displayable picture of the file to be annotated based on the element tree of the picture of the file to be annotated; and
generating the displayable picture of the file to be annotated based on the element of the displayable picture of the file to be annotated.

7. The method of claim 6, wherein the displaying, in the case where the annotation result for the file to be annotated is acquired, the annotation result for the file to be annotated on the annotation page based on the third function module of the annotation tool, comprises:
generating annotation information for the file to be annotated based on an operation event generated on the annotation page by an input device detected by the third function module;
adding the annotation information for the file to be annotated to the element of the displayable picture based on the third function module; and
generating the annotation result for the file to be annotated based on the third function module, according to the element of the displayable picture of the file to be annotated.

8. The method of claim 4, further comprising:
sending the annotation result to a server side based on the first function module, for storage.

9. An electronic device, comprising:
at least one processor; and
a memory communicatively connected with the at least one processor, wherein
the memory stores instructions executable by the at least one processor, the instructions being executed by the at least one processor to enable the at least one processor to perform operations of:
acquiring a first function module generated based on a first language, wherein the first function module is configured for acquiring a file to be annotated;
acquiring a second function module generated based on a second language;
converting the second function module into a third function module in a webpage-oriented binary format, wherein the third function module is configured for presenting the file to be annotated on an annotation page and displaying an annotation result corresponding to the file to be annotated on the annotation page, and wherein the third function module is written using C++,
and the third function module comprises:
Open Graphic Library compatibility layer, configured to translate a desktop Open Graphic Library Application Programming Interface into Web Graphic Library,
picture element layer, configured to abstract each picture element in an annotation picture, and organize each picture element in a tree-shaped manner, wherein picture elements comprise point clouds, cubes or annotation boxes, spheres, and/or cylinders,
rendering window component, configured to call, in a depth-first traversal mode, annotation elements organized in a tree form, so as to render a whole picture, receive events of a mouse and/or a keyboard operation of a user, and/or a window size change through a Simple DirectMedia Layer library, and send the events to other components of the third function module,
task management component, configured to provide an external interface to the first function module, and annotation box creation and adjustment component, configured to create and adjust an annotation box according to instructions of creating a box, adjusting a size of the box, adjusting a position of the box, adjusting an attribute of the box received from the user, and store the annotation box in the picture element layer; and generating an annotation tool based on the first function module and the third function module.

10. The electronic device of claim 9, wherein the instructions are executable by the at least one processor to enable the at least one processor to further perform operations of:
converting a graphic interface in an open graphic library format into a graphic interface in a webpage graphic library format; and
adding the graphic interface in the webpage graphic library format to the third function module.

11. The electronic device of claim 9, wherein the first language is JavaScript, and the second language is C++.

12. An electronic device, comprising:
at least one processor; and
a memory communicatively connected with the at least one processor, wherein
the memory stores instructions executable by the at least one processor, the instructions being executed by the at least one processor to enable the at least one processor to perform operations of:
calling an annotation tool;
invoking a file to be annotated from a server by a first function module of the annotation tool, wherein the first function module is generated in a first language;
presenting the file to be annotated on an annotation page based on a third function module of the annotation tool, wherein the third function module is, in a webpage-oriented binary format, converted from a second function module in a second language, and wherein the third function module is written using C++,
and the third function module comprises:
Open Graphic Library compatibility layer, configured to translate a desktop Open Graphic Library Application Programming Interface into Web Graphic Library,
picture element layer, configured to abstract each picture element in an annotation picture, and organize each picture element in a tree-shaped manner, wherein picture elements comprise point clouds, cubes or annotation boxes, spheres, and/or cylinders,
rendering window component, configured to call, in a depth-first traversal mode, annotation elements organized in a tree form, so as to render a whole picture, receive events of a mouse and/or a keyboard operation of a user, and/or a window size change through a Simple DirectMedia Layer library, and send the events to other components of the third function module,
task management component, configured to provide an external interface to the first function module, and
annotation box creation and adjustment component, configured to create and adjust an annotation box according to instructions of creating a box, adjusting a size of the box, adjusting a position of the box, adjusting an attribute of the box received from the user, and store the annotation box in the picture element layer; and displaying, in a case where an annotation result for the file to be annotated is acquired, the annotation result for the file to be annotated on the annotation page based on the third function module of the annotation tool.

13. The electronic device of claim 12, wherein the presenting the file to be annotated on the annotation page based on the third function module of the annotation tool, comprises:
rendering the file to be annotated based on the third function module, to generate a displayable picture of the file to be annotated; and
presenting the displayable picture of the file to be annotated via the annotation page based on a graphic interface of the third function module.

14. The electronic device of claim 13, wherein the rendering the file to be annotated based on the third function module, to generate the displayable picture of the file to be annotated, comprises:
generating an element tree of the picture of the file to be annotated based on the file to be annotated;
drawing an element of the displayable picture of the file to be annotated based on the element tree of the picture of the file to be annotated; and
generating the displayable picture of the file to be annotated based on the element of the displayable picture of the file to be annotated.

15. The electronic device of claim 14, wherein the displaying, in the case where the annotation result for the file to be annotated is acquired, the annotation result for the file to be annotated on the annotation page based on the third function module of the annotation tool, comprises:
generating annotation information for the file to be annotated based on an operation event generated on the annotation page by an input device detected by the third function module;
adding the annotation information for the file to be annotated to the element of the displayable picture based on the third function module; and
generating the annotation result for the file to be annotated based on the third function module, according to the element of the displayable picture of the file to be annotated.

16. The electronic device of claim 12, wherein the instructions are executable by the at least one processor to enable the at least one processor to further perform operations of:
sending the annotation result to a server side based on the first function module, for storage.

17. A non-transitory computer-readable storage medium storing computer instructions for enabling a computer to perform operations of:
acquiring a first function module generated based on a first language, wherein the first function module is configured for acquiring a file to be annotated;
acquiring a second function module generated based on a second language;
converting the second function module into a third function module in a webpage-oriented binary format, wherein the third function module is configured for presenting the file to be annotated on an annotation page and displaying an annotation result corresponding to the file to be annotated on the annotation page, and wherein the third function module is written using C++,
and the third function module comprises:
Open Graphic Library compatibility layer, configured to translate a desktop Open Graphic Library Application Programming Interface into Web Graphic Library, picture element layer, configured to abstract each picture element in an annotation picture, and organize each picture element in a tree-shaped manner, wherein picture elements comprise point clouds, cubes or annotation boxes, spheres, and/or cylinders, rendering window component, configured to call, in a depth-first traversal mode, annotation elements organized in a tree form, so as to render a whole picture, receive events of a mouse and/or a keyboard operation of a user, and/or a window size change through a Simple DirectMedia Layer library, and send the events to other components of the third function module, task management component, configured to provide an external interface to the first function module, and annotation box creation and adjustment component, configured to create and adjust an annotation box according to instructions of creating a box, adjusting a size of the box, adjusting a position of the box, adjusting an attribute of the box received from the user, and store the annotation box in the picture element layer; and generating an annotation tool based on the first function module and the third function module.

18. The non-transitory computer-readable storage medium of claim 17, wherein the computer instructions are executable by the computer to enable the computer to further perform operations of:

converting a graphic interface in an open graphic library format into a graphic interface in a webpage graphic library format; and adding the graphic interface in the webpage graphic library format to the third function module.

19. A non-transitory computer-readable storage medium storing computer instructions for enabling a computer to perform operations of:

calling an annotation tool;

invoking a file to be annotated from a server by a first function module of the annotation tool, wherein the first function module is generated in a first language;

presenting the file to be annotated on an annotation page based on a third function module of the annotation tool, wherein the third function module is, in a webpage-oriented binary format, converted from a second function module in a second language, and wherein the third function module is written using C++, and the third function module comprises:

Open Graphic Library compatibility layer, configured to translate a desktop Open Graphic Library Application Programming Interface into Web Graphic Library, picture element layer, configured to abstract each picture element in an annotation picture, and organize each picture element in a tree-shaped manner, wherein picture elements comprise point clouds, cubes or annotation boxes, spheres, and/or cylinders, rendering window component, configured to call, in a depth-first traversal mode, annotation elements organized in a tree form, so as to render a whole picture, receive events of a mouse and/or a keyboard operation of a user, and/or a window size change through a Simple DirectMedia Layer library, and send the events to other components of the third function module, task management component, configured to provide an external interface to the first function module, and annotation box creation and adjustment component, configured to create and adjust an annotation box according to instructions of creating a box, adjusting a size of the box, adjusting a position of the box, adjusting an attribute of the box received from the user, and store the annotation box in the picture element layer; and displaying, in a case where an annotation result for the file to be annotated is acquired, the annotation result for the file to be annotated on the annotation page based on the third function module of the annotation tool.

20. The non-transitory computer-readable storage medium of claim 19, wherein the presenting the file to be annotated on the annotation page based on the third function module of the annotation tool, comprises:

rendering the file to be annotated based on the third function module, to generate a displayable picture of the file to be annotated; and presenting the displayable picture of the file to be annotated via the annotation page based on a graphic interface of the third function module.

\* \* \* \* \*